United States Patent [19]
Boelema et al.

[11] Patent Number: 5,641,386
[45] Date of Patent: Jun. 24, 1997

[54] AMINOALKANE DIPHOSPHONIC ACIDS IN PULP BLEACHING

[75] Inventors: Eltjo Boelema, Bathmen; Charles Manuel Navarro, Twello; Lambertus Gerhardus Johannus Olde Hanter, Weerselo; Marcellinus Alexander Van Doorn, Goor, all of Netherlands

[73] Assignee: Akzo Nobel NV, Netherlands

[21] Appl. No.: 356,387

[22] PCT Filed: Oct. 26, 1994

[86] PCT No.: PCT/EP94/03546

§ 371 Date: Feb. 8, 1995

§ 102(e) Date: Feb. 8, 1995

[87] PCT Pub. No.: WO95/12029

PCT Pub. Date: May 4, 1995

[30] Foreign Application Priority Data

Oct. 26, 1993 [EP] European Pat. Off. .............. 93202989
Mar. 22, 1994 [EP] European Pat. Off. .............. 94200728

[51] Int. Cl.$^6$ .................................................. D21C 9/10
[52] U.S. Cl. .................................................. 162/76; 162/80
[58] Field of Search ................. 162/72, 78, 76, 162/80, 81

[56] References Cited

U.S. PATENT DOCUMENTS

| | | | |
|---|---|---|---|
| 3,899,496 | 8/1975 | Schindler et al. | 260/293.51 |
| 3,979,385 | 9/1976 | Wollmann et al. | 260/247 |
| 4,732,650 | 3/1988 | Michalowski et al. | 162/17 |
| 4,752,354 | 6/1988 | Beurich et al. | 162/72 |
| 4,798,652 | 1/1989 | Joyce et al. | 162/60 |
| 4,980,171 | 12/1990 | Fels et al. | 424/473 |
| 5,208,369 | 5/1993 | Crump et al. | 526/106 |

FOREIGN PATENT DOCUMENTS

| | | | |
|---|---|---|---|
| 0141355 | 5/1985 | European Pat. Off. | D21C 9/10 |
| 0402335 | 12/1990 | European Pat. Off. | D21C 9/10 |
| 3531563 | 3/1987 | Germany | D21C 9/10 |
| 4128084 | 2/1993 | Germany | D21C 9/10 |
| 4204915 | 8/1993 | Germany | D21C 5/02 |

OTHER PUBLICATIONS

"Hydrogen Peroxide: Stabilization of Bleaching Liquors", Kutney, G.W., *Pulp & Paper Canada*, vol. 86, No. 12, pp. 182–198, 1985.
"Improving Hydrogen Peroxide Bleaching of Mechanical Pulp: The Effect of Silicate Dose and Other Additives", Burton, J.T., *Pulp & Paper Canada*, vol. 86, No. 6, pp. 144, 147, 1987.
"Chelant Optimization In De–Inking Formulation", Mathur, I., *Pulp & Paper Canada*, 94:10, pp. 55–60, 1993.
"Synthesis of 1–Dialkylaminoalkylidenediphosphonic Acids and Their Properties for Complex Formation", Fukuda, et al., *Yukagaku*, vol. 25, No. 6, pp. 362–364, 1976.
"Acidity and Complex–Formation Properties of Some (Aminomethylene) Bisphosphonic Acids", Gross et al., *Zhurnal Obshchei Khimii*, vo. 48, No. 9, pp. 1914–1916, 1978.
Kirk–Othmer Encyclopedia of Chemical Technology, vol. 19, p. 413 (Third Edition, 1982).
International Search Report for PCT/EP94/03546 dated Jan. 27, 1995.
"Chelating Agents in the Pulp and Paper Industry", Hart, J., *Tappi Journal*, vol. 64, No. 3, pp. 43–44, Mar. 1981.
"The Effect of DTPA on Reducing Peroxide Decompsoition", Bambrick, D.R., *Tappi Journal*, vol. 66, No. 6, pp. 96–100, Jan. 1985.

*Primary Examiner*—Frank Spear
*Attorney, Agent, or Firm*—Dilworth & Barrese

[57] ABSTRACT

A process for the bleaching of pulp comprising the step of bleaching the pulp with hydrogen peroxide and an effective amount of at least one biodegradable 1-aminoalkane-1,1-diphosphonate chelating agent to enhance the bleaching of the pulp, is disclosed. Also disclosed is the use of a 1-aminoalkane-1,1-diphosphonate to enhance the bleaching of pulp with hydrogen peroxide, as well as the pretreatment of pulp with a 1-aminoalkane-1,1-diphosphonate prior to the step of bleaching with hydrogen peroxide. Finally, the deinking of pulp in the presence of 1-aminoalkane-1,1-diphosphonate is also disclosed.

10 Claims, 12 Drawing Sheets

Manganese content in pulp after Q-stage

Conditions: 50° C, 30 min., 5% pulp cons.

Magnesium content in pulp after Q-stage

Conditions: 50° C, 30 min., 5% pulp cons.

Brightness vs total alkali charge in P-stage for different amount of chelating agent in Q-stage Conditions in P-stage: 2h, 60°C, 15% pulp cons.

Brightness vs total alkali with MMBA as waterglass replacer

Conditions in P-stage: 2h, 60°C, 15% pulp cons.

Magnesium content in pulp after Q-stage

Conditions: 90° C, 30 min., 5% pulp cons.

Brightness vs total alkali charge in P-stage for different chelating agent

Conditions in P-stage: 2h, 60° C, 15% pulp cons.

AMINOALKANE DIPHOSPHONIC ACIDS IN PULP BLEACHING

FIELD OF THE INVENTION

The present invention relates to a process for the bleaching of pulp with hydrogen peroxide in the presence of an aminoalkane diphosphonic acid, as well as the pretreatment of pulp with an aminoalkane diphosphonic acid prior to hydrogen peroxide bleaching thereof. The present invention also relates to the use of an aminoalkane diphosphonic acid in the pretreatment of pulp, in the bleaching of pulp with hydrogen peroxide and in the deinking of pulp.

BACKGROUND OF THE INVENTION

Pulps may vary considerably in their color after pulping, depending on the type of wood, processing method, and other factors. For many types of pulp, bleaching is required to obtain a pulp having the desired level of brightness. Brightness is measured by measuring the reflectance in the blue range (457 nm) using magnesium oxide as a standard (100% brightness).

The most used bleaching agent for pulps is hydrogen peroxide because of its low cost and its effectiveness in bleaching. Many different pulp bleaching processes are known which employ hydrogen peroxide as the bleaching agent. A few examples of such processes can be found in U.S. Pat. No. 4,798,652 and 4,732,650. From these patents it can be seen that the process for bleaching wood pulp often involves a pretreatment step and a bleaching step.

From U.S. Pat. No. 4,798,652 it is known to use diethylene triamine pentaacetic acid (DTPA) in the pretreatment of pulps prior to bleaching them with hydrogen peroxide. The pretreatment is generally carried out at a pulp consistency of less than 5% and the chelating agent is preferably a relatively powerful complexing agent.

From U.S. Pat. No. 4,732,650 it is known to use chelating agents in the pretreatment step prior to bleaching the pulp with hydrogen peroxide. Typical chelating agents used in the pretreatment step include ethylene diamine tetraacetic acid (EDTA), DTPA, triethylene tetramine hexaacetic acid (TTHA) and N-hydroxyethylene diamine triacetic acid (HEDTA).

The article, "Chelating Agents in the Pulp and Paper Industry," Hart, J. Roger, Tappi Journal, Vol. 64, No. 3, pp. 43–44, (March 1981) discusses the role of chelating agents in the bleaching of pulps. This article points out that chelating agents may be used both in the pretreatment of pulp prior to the bleaching step, and as an additive to the bleaching liquor during the bleaching step to stabilize hydrogen peroxide. EDTA and DTPA are mentioned as the preferred chelates.

Another article relating to this subject is, "The Effect of DTPA on Reducing Peroxide Decomposition," Bambrick, D. R., Tappi Journal, Vol. 66, No. 6, pp. 96–100, (June 1985) which gives a detailed discussion on the role of DTPA in hydrogen peroxide bleaching of wood pulp in combination with silicates and magnesium compounds. The article, "Hydrogen Peroxide: Stabilization of Bleaching Liquors," Kutney, G. W., Pulp & Paper Canada, Vol, 86, No. 12, pp. 182–189, (1985) gives a detailed summary of a wide variety of compounds which have been used to stabilize hydrogen peroxide bleaching liquors and thereby obtain a higher pulp brightness. Several different chelates are mentioned including EDTA, DTPA and nitrilotriacetic acid (NTA).

Finally, the article, "Improving Hydrogen Peroxide Bleaching of Mechanical Pulp: The Effect of Silicate Dose and Other Additives," Burton, J. T., et al., Pulp & Paper-Canada, Vol. 86, No. 6, pp. 144–147, (1987) gives some further information on the effects of different additives on the bleaching of pulp with hydrogen peroxide.

Among the chelates employed are DTPA and diethylene triamine pentamethylenephosphonic acid (DTMPA, also referred to as DTPMPA). The ultimate goal of using these additives in the bleach liquor is to replace the silicate additives.

From these last two articles it is apparent that it is desirable to reduce the content of silicates in the present pulp bleaching systems. Further, the chelates used in pulp bleaching suffer from the disadvantage that they are substantially non-biodegradable. One goal of present research in the pulp bleaching field is to develop more environmentally friendly bleaching systems by, for example, reducing the silicate content, providing more biodegradable bleaching additives and/or enhancing the activity of the bleaching liquor to thereby use less bleaching liquor to achieve the same level of brightness.

Another article which tends to indicate the desirability of reducing the amount of silicates used in pulp treatment is, "Chelant Optimization in De-Inking Formulation," Mathur, I., Pulp & Paper Canada, 94:10, pp. 55–60 (1993). This article mentions that EDTA, HEDTA, DTPA and DTPMPA are employed in pulp deinking. DTPA is given as the chelate of choice for the deinking process.

It is accordingly the primary object of the present invention to provide an effective pulp bleaching system which is more environmentally friendly than present, commercial bleaching systems employing EDTA and/or DTPA chelating agents with or without silicates.

This and other objects and advantages of the invention will be apparent from the summary and detailed description which follow.

SUMMARY OF THE INVENTION

The present invention relates to a process for the bleaching of wood pulp comprising the step of bleaching the wood pulp with hydrogen peroxide as the primary bleaching agent, characterized in that said bleaching step is carried out in the presence of an effective amount of at least one biodegradable 1-aminoalkane-1,1-diphosphonate chelating agent of the formula (I):

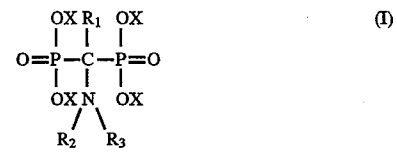

wherein $R_1$ is selected from hydrogen, $C_1$–$C_4$ alkyl and phenyl; $R_2$ and $R_3$ are selected from hydrogen, $C_1$–$C_{22}$ alkyl, $C_5$–$C_6$ cycloalkyl, phenyl, $C_7$–$C_{18}$ alkylphenyl, $C_7$–$C_{18}$ phenylalkyl, an $C_1$–$C_{10}$ alkanol radical such as —$CH_2CH_3OH$, a carboxyalkyl radical having up to 10 carbon atoms such as —$COCH_3$, and, together with the nitrogen atom can form a piperidino, pyrrolidino or a morpholino group; and X is selected from hydrogen, alkali metal and ammonium; to enhance the bleaching of the wood pulp. In a second embodiment, the present invention relates to the use of a chelating agent of the formula I to enhance the bleaching of pulp with hydrogen peroxide.

The present invention also encompasses the step of pretreating the wood pulp in the presence of a chelating agent of the formula I as well as the use of a chelating agent of the formula I in deinking processes.

DETAILED DESCRIPTION OF THE INVENTION

The chelating agents of the formula I above and methods for making them are known from several publications including, "Synthesis of 1-Dialkylaminoalkylidene diphosphonic Acids and Their Properties for Complex Formation," Fukuda, M., et al., *Yukagaku*, Vol. 25, No. 6, pp. 362–64 (1976); U.S. Pat. Nos. 3,899,496 and 3,979,385; and the article, "Acidity and Complex-Formation Properties of Some (Aminomethylene) Bisphosphonic Acids," Gross, H., et al., *Zhurnal Obshchei Khimii*, Vol. 48, No. 9, pp. 1914–16, (September 1978) (hereinafter referred to as "Gross"), among others.

These publications mention several uses of the chelating agents of the formula I including water softening, use in cleaning products to remove deposits from fabrics during washing, use in dyebaths and use as builders for washing compositions. However, none of these publications suggest the use of chelates of the formula I in pulp bleaching processes or in pulp bleaching liquors, or that these materials are potentially biodegradable.

In addition, the stability constants of complexes of some of the compounds of the formula I are known from Gross. Using these stability constants, one can predict the complex-forming ability of the chelating agents. The stability constants, however, are not the best indicator in this respect since complex-formation is strongly dependent upon the pH of the system. Accordingly, a better basis for comparison is the conditional stability constant which is the Akzo Technical Leaflet 217.

Figure 1:
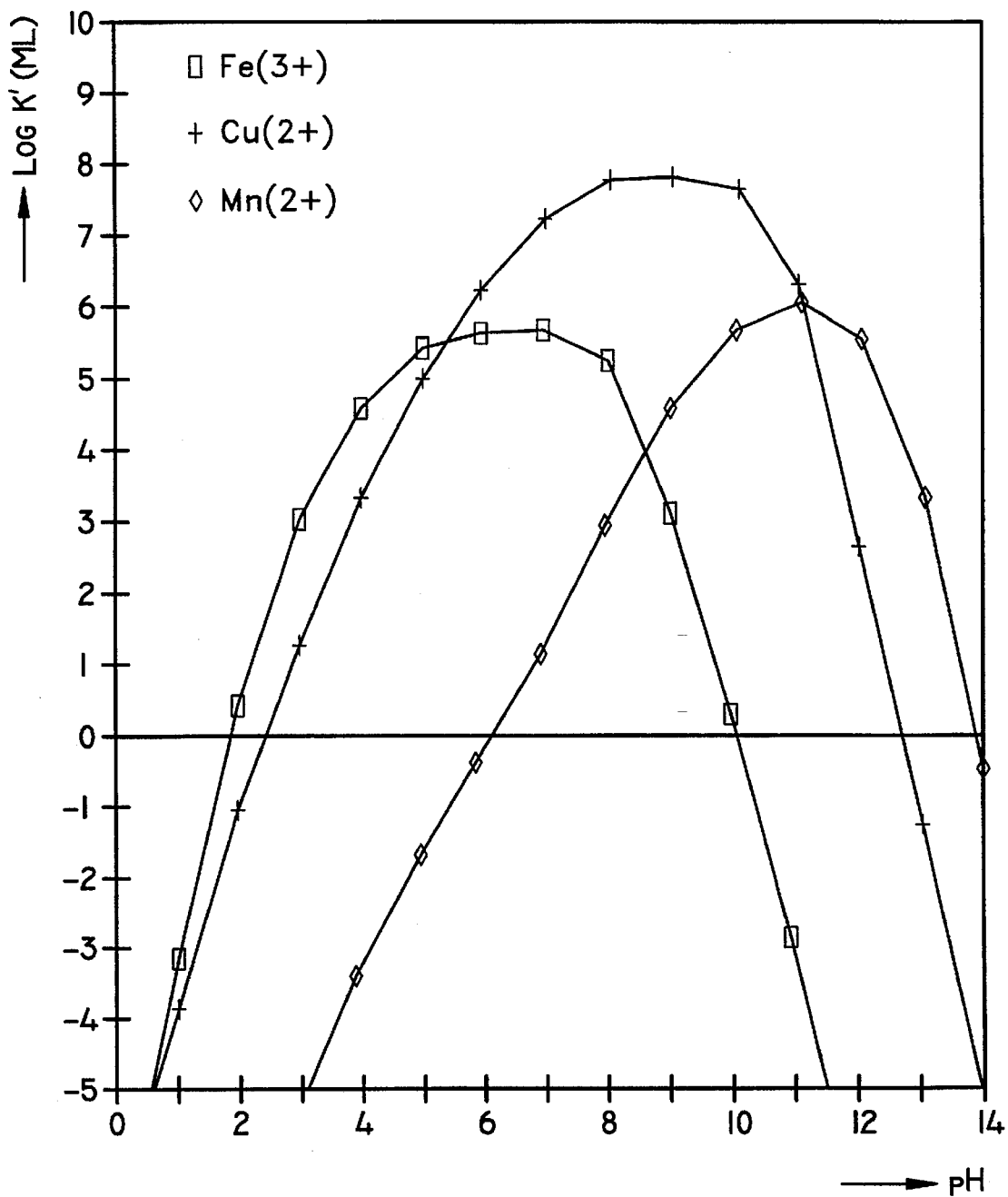
FIG. 1 is a graph of the calculated conditional stability constants of (4-morpholinomethylene) bisphosphonic acid for the complexation of various metal ions.
Figure 2:
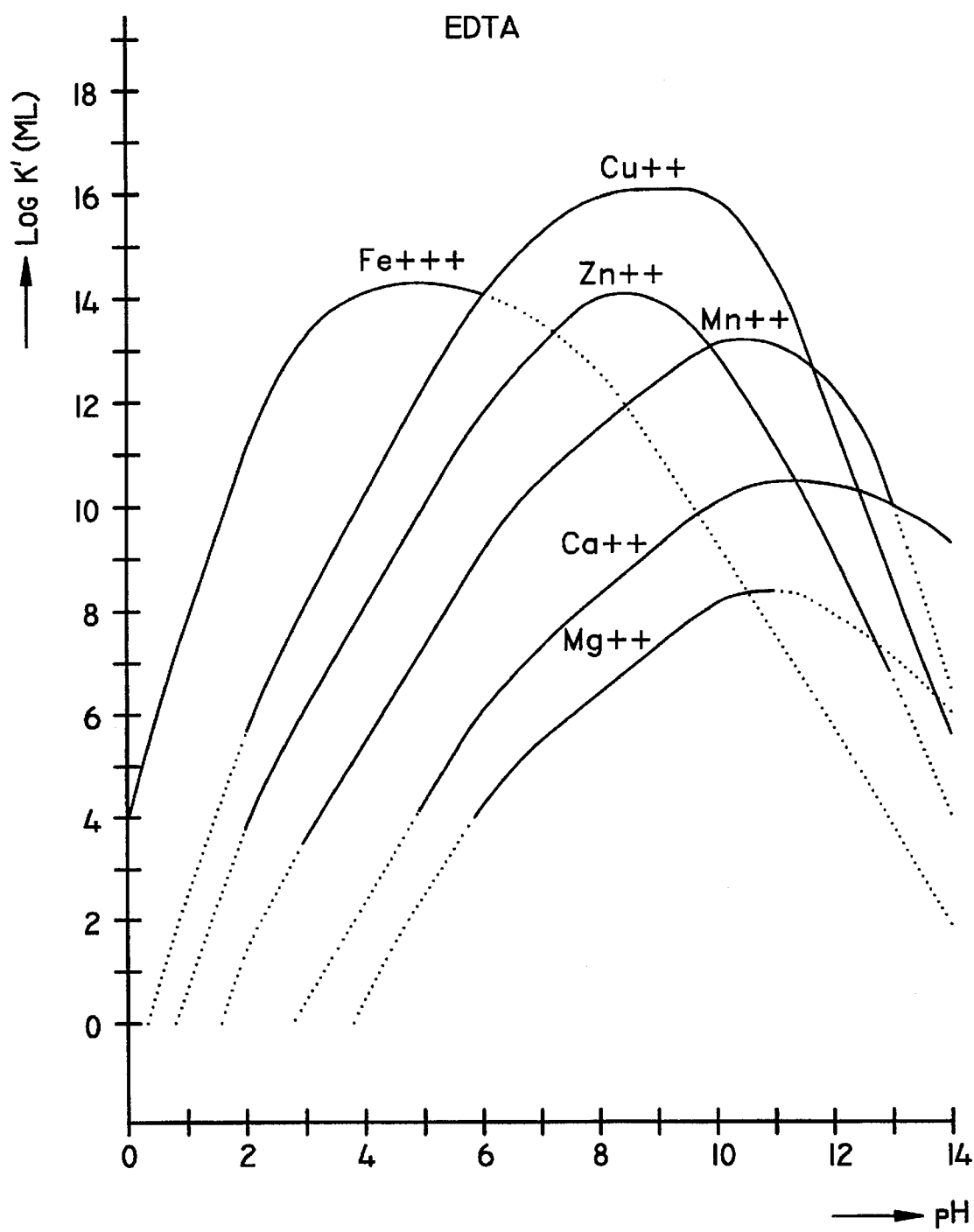
FIG. 2 is a graph of the calculated conditional stability constants of EDTA for the complexation of various metal ions.
Figure 3:
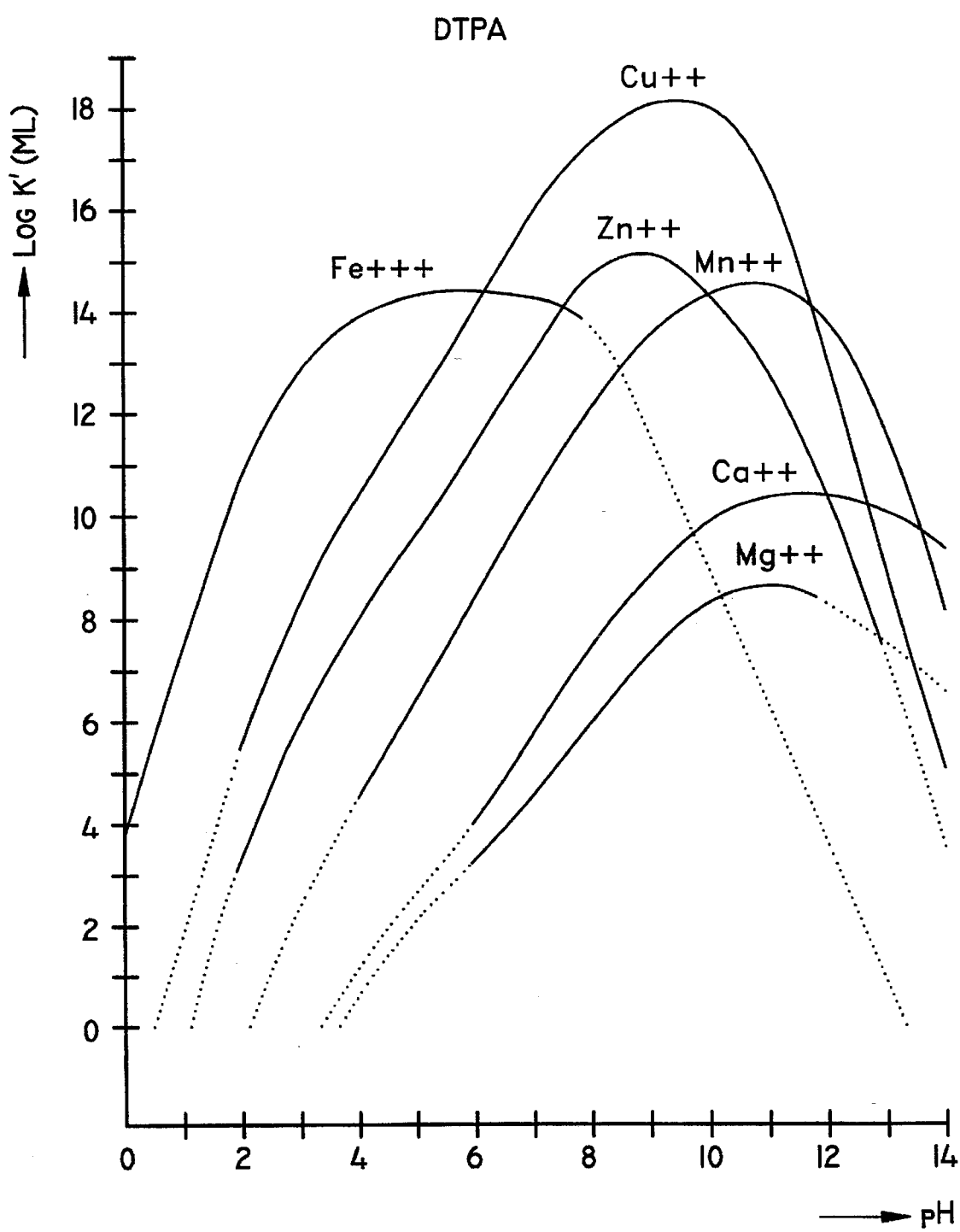
FIG. 3 is a graph of the calculated conditional stability constants of DTPA for the complexation of various metal ions.

Referring to FIGS. 1–3, it can be seen that the conditional stability constants for (4-morpholinomethylene)-1,1-diphosphonic acid, a compound of the formula I above, are far lower than the comparable constants for EDTA and DTPA. From this, one would predict a far lower chelating activity for the compound of the present invention than for either EDTA or DTPA. Accordingly, it was expected from these data that (4-morpholinomethylene)-1,1-diphosphonic acid would perform far worse than DTPA in pulp bleaching processes.

However, the present inventors have unexpectedly found that the compounds in accordance with the present invention perform at least as well in pulp bleaching processes as EDTA or DTPA thereby offering an important improvement in the pulp bleaching process by providing a biodegradable replacement for known chelates which is more friendly to the environment. EDTA and DTPA are known to exhibit practically no biodegradability.

By the term "biodegradable" as used in this patent application is meant that a significant percentage of the material is degraded in the semi-continuous activated sludge test (SCAS test) and the closed bottle test in a 28 day period. Further details regarding the experimental methods used to determine biodegradability can be found in the examples appended hereto.

A typical pulp bleaching process involves at least two steps, a pretreatment step and a bleaching step. The pretreatment step reduces the impurities in the pulp and, in particular, the metal ion concentration of the pulp prior to the bleaching step. For the purposes of the present invention, the compounds of the formula I can be employed in the pretreatment of pulp.

It would be expected, on the basis of their conditional stability constants, that such compounds would perform poorly in pulp pretreatment. However, the present inventors have found that the compounds of the formula I offer a viable alternative to the commonly used chelates EDTA and DTPA in the pretreatment of pulp, while also providing the added advantage of biodegradability. This is an important advantage since the pulp industry is a notoriously waste intensive industry which spends huge sums of capital on waste treatment.

In a typical pretreatment step, a large volume of pulp is rinsed with water which contains a compound of the formula I, optionally at elevated temperatures. In this manner, many of the water-soluble impurities are washed out of the pulp and via the compound of the formula I, the metal ion concentration of the pulp can be significantly reduced. This pretreatment in accordance with the present invention is applicable to both chemical (Kraft and Sulphite) and mechanical pulps such as SGW, PGW, TMP and CTMP.

More specifically, pretreatment can be carried out using 0.1–2.0% by weight of a chelate of the formula I for a period of as little as 5 minutes and as long as overnight, if desirable. More preferred processes will employ a pretreatment of 5 minutes to one hour, a temperature of 40°–90° C. and a pH of 5–9. Typically, the pulp consistency for pretreatment will be 1–5% and, preferably, 1–3%. In addition, the same optional additives may be applied in the pretreatment step as are mentioned for the bleaching step described below.

The present invention is also directed to the pulp bleaching step. The process is suitable for the bleaching of chemical and mechanical pulps, as well as recycled pulps. In particular, the mechanical pulps SGW, PGW, TMP and CTMP are included, as well as the chemical pulps Kraft and Sulphite. In a preferred embodiment, the process is applied to the bleaching of mechanical pulp.

The present process employs a bleaching temperature of 40°–95° C. and, more preferably, 50°–75° C. A typical pulp will have a dry weight mass of 5–40% of the total pulp weight and will have been pretreated prior to bleaching. The bleaching time is generally from 10–120 minutes and, more preferably from 40–90 minutes. Bleaching is generally carried out at a pH of 9–12 with pH 10–12 being more preferable.

In the process, typically 0.1–3.0% by weight, based on the total pulp weight, of hydrogen peroxide is employed as the bleaching agent. To this is added one or more biodegradable compounds of the formula I in an amount of 0.01–2.0% by weight, based on the total pulp weight. The optimum amount of the compound of the formula I that is employed will depend, to some extent, on the heavy metal content of the pulp being bleached. Higher metal contents will require additional chelating agent of the formula I.

In addition to the bleaching agent and the chelating agent, other standard additives to the bleaching process may be employed. For example, 0–3 weight percent of a conventional silicate additive, based on the total pulp weight, may be employed in addition to the chelating agent. Further, 0–0.2% by weight, based on the total pulp weight, of magnesium sulphate may also be employed in the process of the present invention. The silicate and magnesium sulphate components are typically added to buffer the solutions in order to maintain a relatively constant pH throughout the bleaching step.

Other additives which may be employed in the process of the present invention in addition to the chelating agent of the formula I include such products as citric acid, DTPA, DTPMPA, EDTA, gluconates and lignosulphonates which may also have some chelating activity. In this embodiment with additional additives, the chelates of the formula I are used to replace a portion of the known chelating agents in order to make the pulp bleaching process more environmentally friendly. These are optional ingredients which may or may not be employed in the present process. If such ingredients are employed, conventional amounts of about 0.01–2.0 weight percent, based on the total weight of the pulp, are used.

From the *Kirk-Othmer Encyclopedia of Chemical Technology*, Vol. 19, page 413 (Third Edition 1982) it is known that mechanical pulps generally exhibit initial brightness values of 50–65% (GE brightness). It is also known that each 1% increase in brightness is significant and commercially interesting as long as the cost of such a brightness increase is not excessive.

Despite the fact that the conditional stability constants of the present chelating agents predict that they would be inferior to the commercially employed pulp bleaching agent DTPA, tests have shown that the present chelating agents give a brightness increase of the same order as DTPA. This result is totally unexpected. Further, the present chelating agents have the additional significant, unexpected advantage that they exhibit a significant degree of biodegradability.

The preferred chelating agents of the formula I for use in the process of the present invention are 4-morpholinomethylene-1,1-diphosphonic acid (MMBA), [(dimethylamino)methylene]bis-phosphonic acid (DMAMBP), (1-aminomethylidene)bis-phosphonic acid (AMBP) and (1-amino-ethylidene)bis-phosphonic acid (AEBP). The most preferred chelating agents are the compounds of the formula I which exhibit the greatest degree of biodegrability. These include compounds of the formula I in which $R_1$ is hydrogen.

In another embodiment, the present invention relates to the use of the compounds of the formula I to enhance the bleaching of pulp with hydrogen peroxide. This use is substantially as described above with respect to the process for bleaching pulp.

In another aspect, the present invention relates to the use of chelates of the formula I in the deinking of recycled pulp products. Deinking is generally performed using hydrogen peroxide and thus the present chelants can also be used in paper deinking. Typically, the waste paper furnish will comprise newspapers, magazines, etc.

Deinking is carried out using hydrogen peroxide in a caustic environment in the conventional manner with the exception that the chelates of the formula I are employed in the deinking process. Generally, from 0.1 to 2.0 weight percent of the chelant will be employed. Of course, mixtures of two or more chelants may also be employed within the scope of the present invention. Further, optional deinking additives such as silicates may be employed, if necessary or desirable.

The invention is further illustrated by the following non-limitative examples.

EXAMPLE 1

Closed Bottle Test for Biodegradability of 4-Morpholinomethylene-1,1-Diphosphonic Acid (MMBA)

Secondary activated sludge and primary settled sewage were collected from the WWTP Niewgraaf sewage treatment facility in Duiven, the Netherlands on a weekly basis and stored at −20° C. until required for testing. These samples were used for the closed bottle test performed in 250–300 ml biological oxygen demand (BOD) bottles with glass stoppers and for the SCAS test which was performed in 150 ml SCAS units.

An aqueous stock solution was made from 1.0 g/l MMBA and a buffer comprising 155 g/l $K_2HPO_4$ and 85 g/l $NaH_2PO_4.H_2O$. An aqueous nutrient medium for the closed bottle test was prepared from water, 8.5 mg/l $KH_2PO_4$, 21.75 mg/l $K_2HPO_4$, 33.3 mg/l $Na_2HPO_4.2H_2O$, 22.5 mg/l $MgSO_4.7H_2O$, 27.5 mg/l $CaCl_2$ and 0.25 mg/l $FeCl_3.6H_2O$. Ammonium chloride was omitted from the nutrient medium to prevent nitrification.

The closed bottle test was performed according to OECD Guidelines for Testing Chemicals, Section 3: Degradation and Accumulation No. 302 A, Inherent Biodegradability, modified SCAS test (1981) Paris Cedex France; EEC, 1988: "Official Journal of the European Communities," L133, 1988.05.30, Part C: Methods for the Determination of Ecotoxicity. Biodegradability Modified SCAS test; and ISO/TC/SC 5 Water Quality—Evaluation of the Aerobic Biodegradability of Organic Compounds in an Aqueous Medium—Semi-Continuous Activated Sludge Method (SCAS 1991). The test was performed in diffused light at 20°–25° C.

Use was made of 3 bottles containing only inoculum and 3 bottles containing test substance and inoculum. The concentrations of the test compound and sodium acetate in the bottle were 2.0 and 6.7 mg/l, respectively. The inoculum was diluted to 2 mg DW/l in the closed bottles. Each of the prepared solutions was dispensed into the respective group of BOD bottles so that all bottles were completely filled without air bubbles. The zero time bottles were immediately analyzed for dissolved oxygen using an oxygen electrode. The remaining bottles were closed and incubated at 21° C. in the dark. The oxygen concentration was determined on days 7, 14, 21 and 28.

One deviation from the standard closed bottle test was introduced, namely that a special funnel was employed to measure the oxygen concentration in the same bottles in triplicate. The closed bottle test was prolonged by measuring the course of the oxygen decrease in the bottles using the same special funnel which fitted exactly in the BOD bottles. Subsequently, the oxygen electrode was inserted into the BOD bottle to measure the oxygen concentration and the medium dissipated by the electrode was collected in the funnel. After withdrawal of the electrode, the collected medium flowed back into the bottle from the funnel, followed by removal of the funnel and reclosure of the bottle.

The theoretical oxygen demand (ThOD) was calculated using the molecular weight of the MMBA. The biochemical oxygen demand (BOD) was calculated by dividing the actual oxygen consumption by the concentration of the test substance in the closed bottle. The biodegradation percentage is the ratio of the BOD to the ThOD. The results are given in Table 1.

TABLE 1

Oxygen consumption and percentage of biodegradation of MMBA. The closed bottle test was inoculated with sludge from the SCAS test of day 0 and day 28.

| Time (days) | Day 0 Oxygen consumption (mg/l) | Bio-degradation (%) | Day 28 Oxygen consumption (mg/l) | Bio-degradation (%) |
|---|---|---|---|---|
| 0 | 0.0 | 0 | 0.0 | 0 |
| 7 | 0.2 | 12 | 1.4 | 88 |
| 14 | 0.3 | 19 | 1.5 | 94 |
| 21 | 0.7 | 44 | 1.6 | 100 |
| 28 | 0.8 | 50 | 1.7 | 100 |
| 42 | 1.0 | 63 | — | — |

EXAMPLE 2

SCAS Test for Biodegradability of 4-Morpholinomethylene-1,1-Diphosphonic Acid (MMBA)

The same materials as in Example 1 were used for the SCAS test. An aqueous stock solution was made from 1.0 g/l MMBA and a buffer comprising 155 g/l $K_2HPO_4$ and 85 g/l $NaH_2PO_4.H_2O$. The SCAS test was performed according to the same guidelines as set forth in Example 1. The test was performed in diffused light at 20°–25° C.

Each SCAS unit was filled with 150 ml of activated sludge and the aeration was begun. After 23 hours the aeration was stopped and the sludge was allowed to settle for 45 minutes. Before settling the walls of the units were cleaned to prevent accumulation of solids above the liquid level with a separate brush for each unit to prevent cross-contamination. The tap was opened and 100 ml of the supernatant liquor was withdrawn. Subsequently, 99 ml of primary settled sewage and 1 ml of concentrated phosphate buffer was added to the sludge remaining in each SCAS unit and aeration was started anew. The units were fed daily with primary settled sewage.

At day 0, the individual settled sludges were mixed and 50 ml of the resulting composite sludge was added to each SCAS unit. 94 ml of primary settled sewage, 5 ml of deionized water and 1 ml of concentrated phosphate buffer were added to the control unit and 94 ml of primary settled sewage, 5 ml of the MMBA stock solution and 1 ml of concentrated phosphate buffer were added to each test unit. Aeration was continued for 23 hours. The above-described fill and draw procedure was repeated 6 times per week throughout the test.

The test deviated slightly from the standard SCAS procedure in that the fill and draw procedure was performed 6 times per week rather than daily, 1 ml of concentrated phosphate buffer was added 6 times per week to maintain the pH of the SCAS units constant, and effluent samples were filtered using Schleicher and Schüll membranes (cellulose nitrate) with pores of 8 μm.

The non-purgeable organic carbon (NPOC) was determined by acidifying the filtered samples and injecting them into a Dohrmann DC-190 NPOC apparatus. The pH of the supernatant liquor was determined with a microcomputer pH meter Consort P207 and the dissolved oxygen concentrations were determined electrochemically using an oxygen electrode (WTW Trioxmatic EO 200) and meter (WTW OXI 530). The temperature was measured with a Control One (ex. IBT, Rotterdam). The dry weight (DW) of the inoculum was determined by filtering 100 ml of the activated sludge over a preweighed 8 μm Schleicher and Schüll filter, drying the filter for 1.5 hours at 104° C. and weighing the filter after cooling.

The percentage removal in the SCAS test unit was calculated using the following equation:

Percentage Removal = $100 \times [C_T - (C_f - C_c)]/C_T$ $C_T$ = The concentration of the test compound as non-purgeable organic carbon added to the settled sewage at the start of the aeration period.

$C_f$ = The concentration of the non-purgeable organic carbon found in the supernatant liquor of the test at the end of the aeration period.

$C_c$ = The concentration of the non-purgeable organic carbon found in the supernatant liquor of the control.

The results are given in Table 2.

TABLE 2

NPOC concentrations in the effluent of the control and test unit and the calculated removal percentages of MMBA.

| Time (days) | NPOC Control (mg/l) | NPOC Test (mg/l) | Removal (%) |
|---|---|---|---|
| -4 | 14.7 | 14.0 | — |
| -1 | 15.1 | 15.1 | — |
| 0 | 13.1 | 13.7 | — |
| 1 | 13.0 | 14.3 | 91 |
| 2 | 14.9 | 16.4 | 89 |
| 3 | 13.7 | 17.0 | 76 |
| 4 | 2.4 | 15.1 | 80 |
| 6 | 13.9 | 16.5 | 81 |
| 7 | 14.0 | 16.9 | 79 |
| 8 | 13.1 | 14.9 | 87 |
| 9 | 14.5 | 16.1 | 88 |
| 10 | 13.7 | 16.9 | 77 |
| 11 | 13.8 | 16.5 | 80 |
| 14 | 14.7 | 16.3 | 88 |
| 16 | 15.1 | 17.1 | 85 |
| 18 | 18.5 | 18.6 | 99 |
| 21 | 15.8 | 17.2 | 90 |
| 23 | 14.7 | 17.4 | 80 |
| 25 | 14.5 | 18.6 | 70 |
| 28 | 15.1 | 17.8 | 80 |
| 30 | 9.3 | 17.7 | 39 |
| 32 | 9.1 | 15.2 | 55 |
| 35 | 10.4 | 13.4 | 78 |

EXAMPLE 3

Thermomechanical pulp (TMP) having a 20% pulp consistency, an initial brightness of 57.7%, and a metal content of 1.9 mmol/kg (Fe, Cu, Mn, Zn) was bleached at 60° C. for 120 minutes with 10 and 30 $kg/t_{100}$ hydrogen peroxide (control) and combined with equimolar amounts of 0.97 kg $DTPA-H_5/t_{100}$ (the commercially available bleach additive) or with 0.72 kg $MMBA/t_{100}$ (an additive in accordance with the invention) in the presence of 30 $kg/t_{100}$ silicate and 1 $kg/t_{100}$ magnesium sulphate. The initial pH of the bleaching liquor was 11.5 measured at 25° C. The results are given in Table 3. The pretreatment step included no chelating agents and thus consisted of a water wash at a temperature of 25° C. and a pH of 6.2.

TABLE 3

| Amount H$_2$O$_2$ | Brightness Control (%) | Brightness DTPA (%) | Brightness MMBA (%) |
|---|---|---|---|
| Unbleached | 57.7 | — | — |
| 10 kg/t$_{100}$ | 64.5 | 66.9 | 65.5 |
| 30 kg/t$_{100}$ | 70.0 | 72.4 | 73.0 | t$_{100}$ represents one metric ton of dry, solid pulp.

EXAMPLE 4

[(Dimethylamino)methylene]bis-phosphonic acid (DMAMBP) and (1-aminoethylidene)bis-phosphonic acid (AEBP) were synthesized by known methods and tested for hydrogen peroxide stabilization A. Measurement of hydrogen peroxide concentrations of 0–1%.

With a diluter set to dilute 96 μl to 15 ml, a sample of 96 μl of hydrogen peroxide solution was taken. The solution was placed in the stirred beaker with a color reagent obtained by diluting 173 g. sulfuric acid and 45 ml of 15% w/v Ti(SO$_4$)$_2$ solution up to 500 ml with demineralized water to give a stock solution and then further diluting 58.5 ml of the stock solution to 1 liter with demineralized water. 15 ml of a yellow colored mixture was obtained. This mixture was drawn through a cuvette and the absorbency was measured to determine the hydrogen peroxide concentration.

B. Hydrogen Peroxide Stabilization Test

Fourteen polyethylene bottles were filled with 5.0 ml of a metal solution containing 20 ppm Cu(II), 40 ppm Fe(III) and 50 ppm Mn(II). One control bottle was filled with water. To all of these bottles except one was added 5.0 ml of sequestering agent solution containing 0.5 w/w% DMAMBP or AEBP in demineralized water and 10.0 ml of sodium p-phenolsulphonate solution (0.1M). The total weight of the solution was brought to 30 g. using additional demineralized water. The pH was then adjusted to 9.5 with either sodium hydroxide or hydrochloric acid, as needed. The total weight of the solutions was then brought to 45 g. with additional demineralized water. To these solutions, 5.0 ml of 10% hydrogen peroxide solution was added.

This produced solutions containing 2 ppm Cu(II), 4 ppm Fe(III), 5 ppm Mn(II), 0.05% sequestering agent, 0.02M sodium p-phenolsulphonate and 1% by weight of hydrogen peroxide.

The bottles were inserted in a heating bath and shaken at 50° C. (120 rpm). Each half hour a sample was taken quickly and inserted into a numbered standby bottle. From the samples, the hydrogen peroxide content was determined using the method described above. The results are given in Table 4.

TABLE 4

| Sequestering Agent | % Peroxide Remaining in Solution | | | |
|---|---|---|---|---|
| | 30 min | 60 min. | 90 min. | 120 min. |
| DMAMBP | 92 | 90 | 87 | 86 |
| AEBP | 99 | 98 | 98 | 97 |

This example demonstrates that DMAMBP and AEBP are effective for hydrogen peroxide stabilization. Hydrogen peroxide stabilization is a good indication of the chelating ability of the present compounds.

The foregoing examples were presented for the purpose of illustration and description only and are not to be construed as limiting the invention in any way. The scope of the invention is to be determined from the claims appended hereto.

EXAMPLE 5 a. Experimental

In the following tests the pulp used was a TMP from a Scandinavian mill (unless stated otherwise). The pulp was taken from a storage tank before bleaching and dewatered before the evaluation started. The experimental conditions were as follows:

Untreated pulp characteristics:

| Brightness: | 60.2% ISO | |
|---|---|---|
| Metal content: | Ca: | 590 ppm |
| | Cu: | 3 ppm |
| | Fe: | 2 ppm |
| | Mg: | 75 ppm |
| | Mn: | 34 ppm |

The pulp was pretreated (Q-stage) with various chelating agents at the following conditions:

| DTPA, | |
|---|---|
| Pulp consistency: | 5% |
| Temperature: | 50° C. |
| Time: | 30 min. |
| DTPA charge: | 2 kg/t pulp |
| MMBA, | |
| Pulp consistency: | 5% |
| Temperature: | 50 and 90° C. |
| Time: | 30 and 60 min. |
| MMBA charge: | 2–6 kg/t pulp |
| DMAMDPA, | |
| Pulp consistency: | 5% |
| Temperature: | 90° C. |
| Time: | 30 min. |
| DTPA charge: | 6 kg/t pulp |

The bleaching stage (P-stage) was performed as shown below:

| Pulp consistency: | 15% |
|---|---|
| Temperature: | 60° C. |
| Time: | 2 h and 4 h for MMBA as a waterglass replacer. |
| Peroxide charge: | 10–40 kg/t pulp |

The total alkali charge was optimized for each peroxide charge.

b. MMBA as a complexing agent (Q-stage)

MMBA was tested as a complexing agent in a pretreatment stage on a TMP pulp. After the treatment the pulp was dewatered and washed with deionised water and then again dewatered before the metal content in the pulp was analyzed. The reference was pretreated with DTPA.

Figure 4:
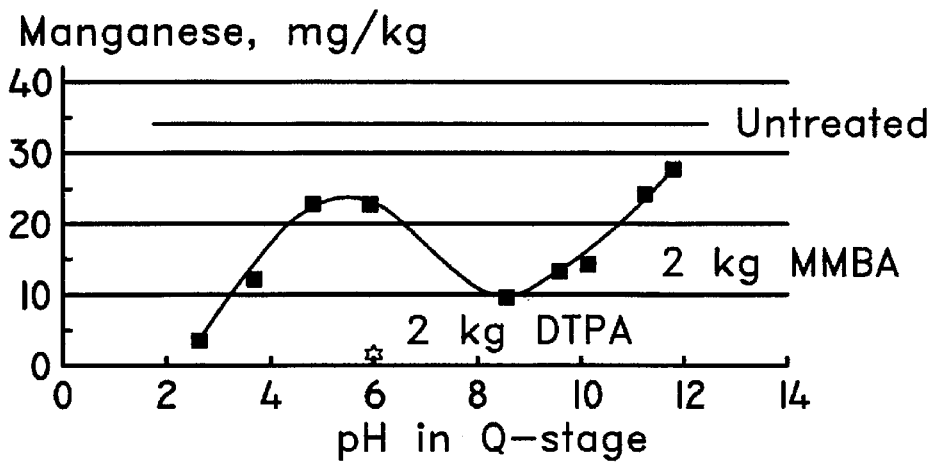
FIGS. 4 to 17 are graphs illustrating Examples 5 to 9. Their explanation is given in the respective examples.
Figure 5:
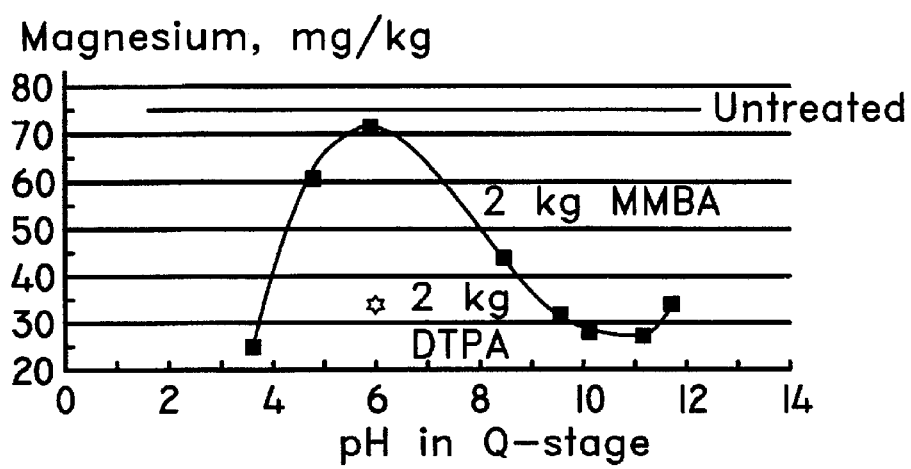

FIGS. 4 and 5 show the manganese and magnesium content in the pulp at various pH's in the pretreatment stage. MMBA worked effectively around pH 8.5. The results show that MMBA is effective in reducing the level of manganese in the pulp. Manganese has an adverse effect on the peroxide in the bleaching stage. However, it also reduces the level of magnesium. Magnesium has a beneficial effect at the bleaching stage, in particular when bleaching kraft pulp. This example illustrates that 4 kg MMBA reduced the manganese content in the pulp to less than 10 mg/kg. This is sufficient to obtain a positive response in the bleaching stage. The low metal content between pH 2 and 3 was due to an acid effect. Pretreatment experiments for 30 and 60 minutes show that 30 minutes is sufficient to reach a low level of manganese in the pulp.

c. Bleaching stage (P-stage)

Figure 6:
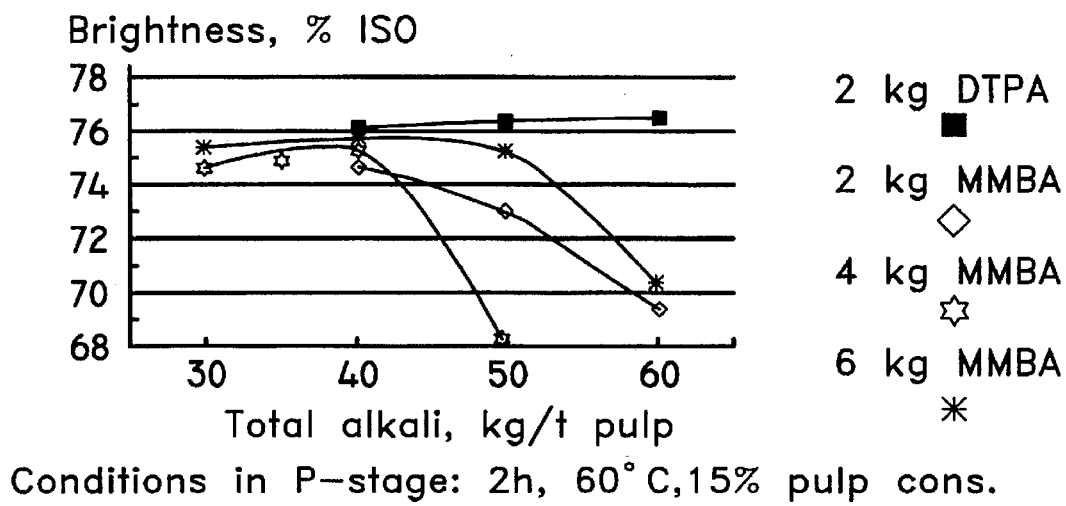

After treatment with MMBA, the pulp was bleached with 40 kg peroxide/t pulp. FIG. 6 shows the brightness after P-stage with different amounts of MMBA and 2 kg DTPA in Q-stage. In the P-stage, peroxide, waterglass and alkali were used (Eka standard). 2 kg DTPA and 6 kg MMBA gave similar brightness results. However, MMBA is more sensitive with respect to alkali changes and cannot control the manganese level as good as DTPA.

d. Magnesium addition in the bleaching stage

When bleaching TCF on kraft pulps it is often necessary to add extra magnesium to the bleaching stage. A test with extra magnesium on this pulp after pretreatment with MMBA/DTPA showed no effect on brightness. While not wishing to be bound by any theory, it is thought that the absence of an effect on the brightness may be due to the waterglass addition in the bleaching stage. In this case the waterglass seems to perform the same function as the magnesium on a kraft pulp.

EXAMPLE 6

MMBA as a waterglass replacer

Figure 7:
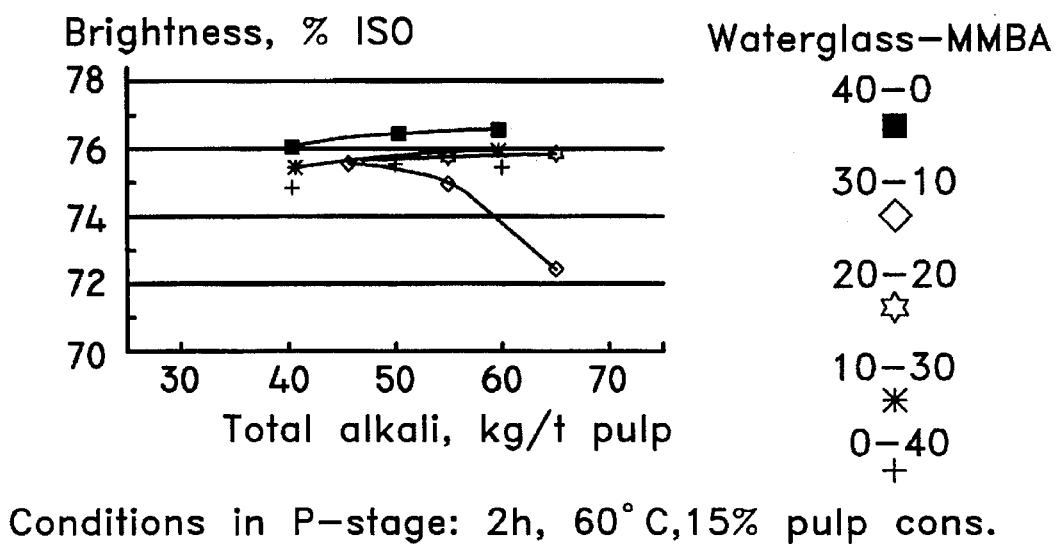

For these tests the pulp used was pretreated with DTPA. The samples were bleached with 40 kg peroxide/t pulp, alkali optimized. For reference bleaching, 40 kg waterglass/t pulp was used. For reference bleaching, 40 kg waterglass/t pulp was used. In the tests the waterglass was gradually replaced by MMBA in the way as indicated in FIG. 7. The results show that waterglass gives the highest brightness. The high amount of MMBA has probably overstabilised the peroxide and therefore resulted in a lower brightness. It also appears that the residual amounts of peroxide are very high for these samples.

Figure 8:
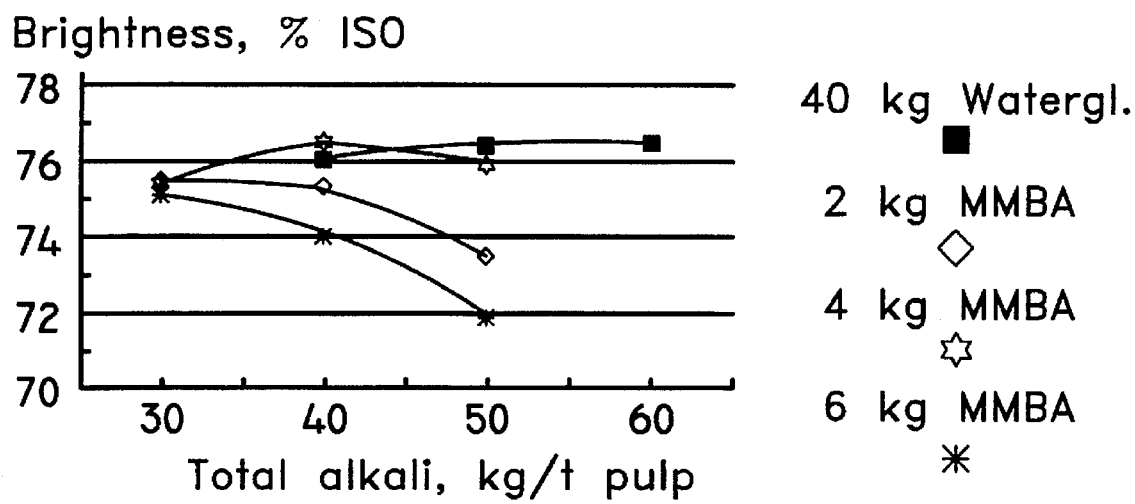

An additional test with MMBA as a waterglass replacer was carried out and this time the charges were 2–6 kg/t pulp, respectively. Previous tests showed that a longer bleaching time the brightness when using MMBA in the bleaching stage. The bleaching time for the samples with MMBA was therefore adjusted to 4 h. For the reference sample, with waterglass, the bleaching time was 2 h, in accordance with the standard procedure. FIG. 8 shows that a charge of 4 kg MMBA/t pulp gives the same brightness as with 40 kg waterglass/t pulp. Tests were also carried out on pulp pretreated with DTPA and DTPA as waterglass replacer. The results show that DTPA does not give higher brightness than MMBA or waterglass.

EXAMPLE 7

Another chelating agent, DMAMDPA, was also tested in the pretreatment stage (Q-stage) as a complexing agent and as a waterglass replacer in the bleaching stage (P-stage). Tests were carried out with 6 kg DMAMDPA/t pulp.

a. Complexing stage (Q-stage)

Figure 9:
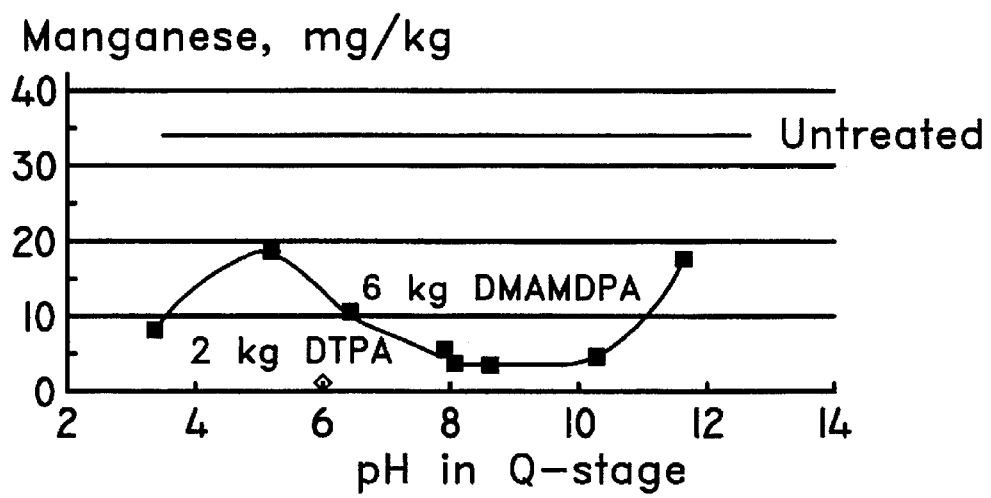
Figure 10:
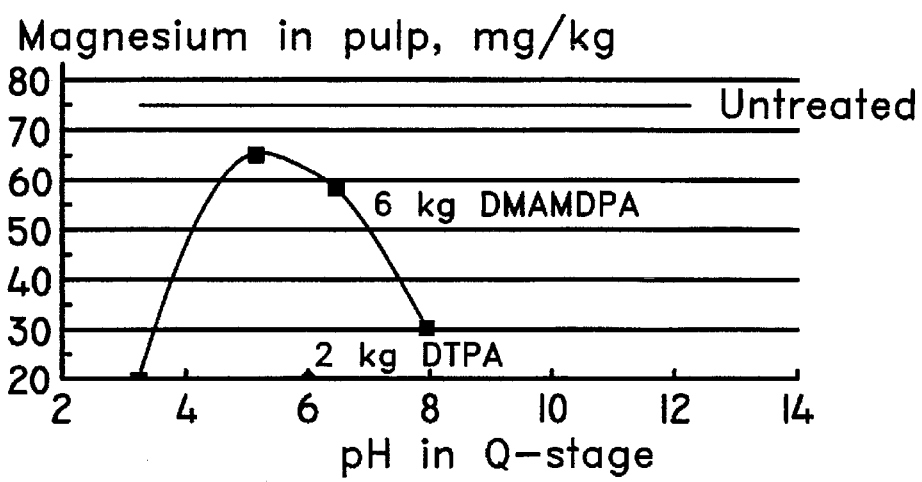

After the pretreatment the pulp was dewatered and washed with deionised water and then again dewatered before the metal content in the pulp was analyzed. The content of manganese and magnesium in the pulp after Q-stage are shown in FIGS. 9 and 10. The optimum pH, where the manganese content is lowest, is around 8. DMAMDPA appears to be less sensitive against alkali changes than MMBA.

b. Bleaching stage (P-stage)

Figure 11:
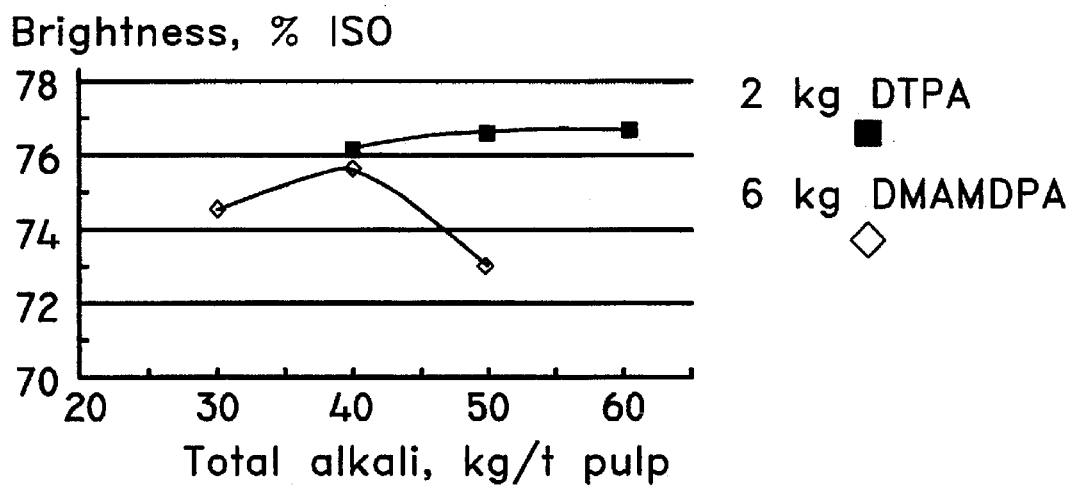
Figure 12:
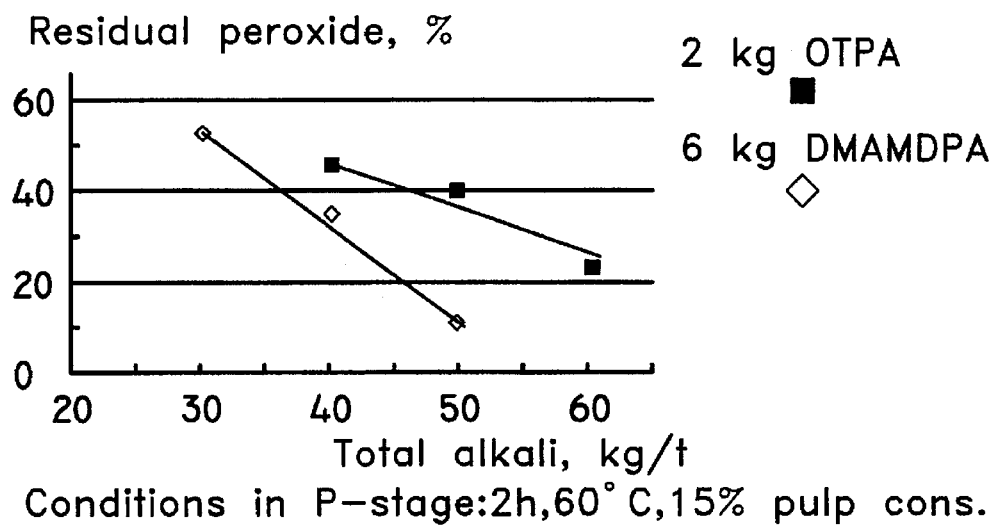

Pulp with the lowest manganese content from the Q-stage was bleached in a P-stage according to a standard procedure (Eka standard), i.e. 40 kg peroxide/t pulp, 40 kg waterglass and alkali was optimized. FIGS. 11 and 12 show the results according to brightness and residual peroxide. As shown, the reference (2 kg DTPA/t pulp) gives a somewhat higher brightness than DMAMDPA.

EXAMPLE 8

DMAMDPA as a waterglass replacer

Figure 13:
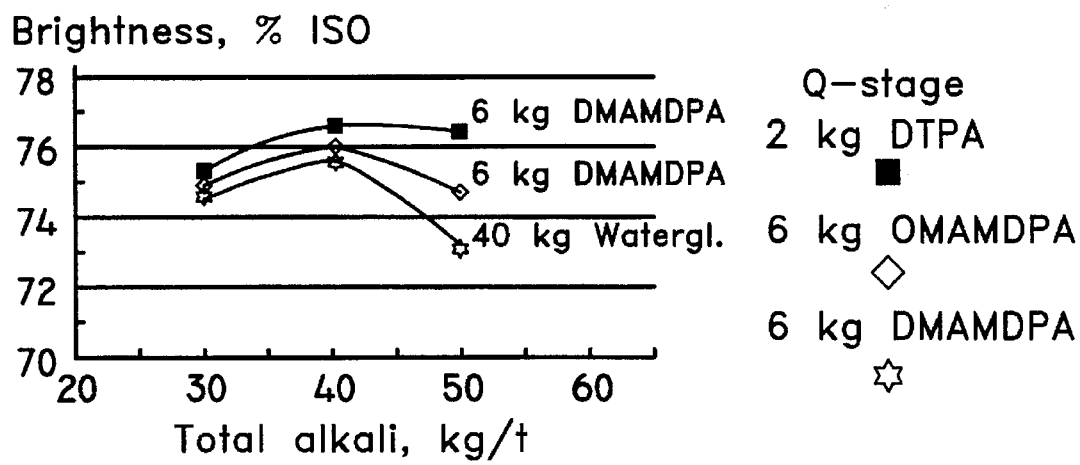
Figure 14:
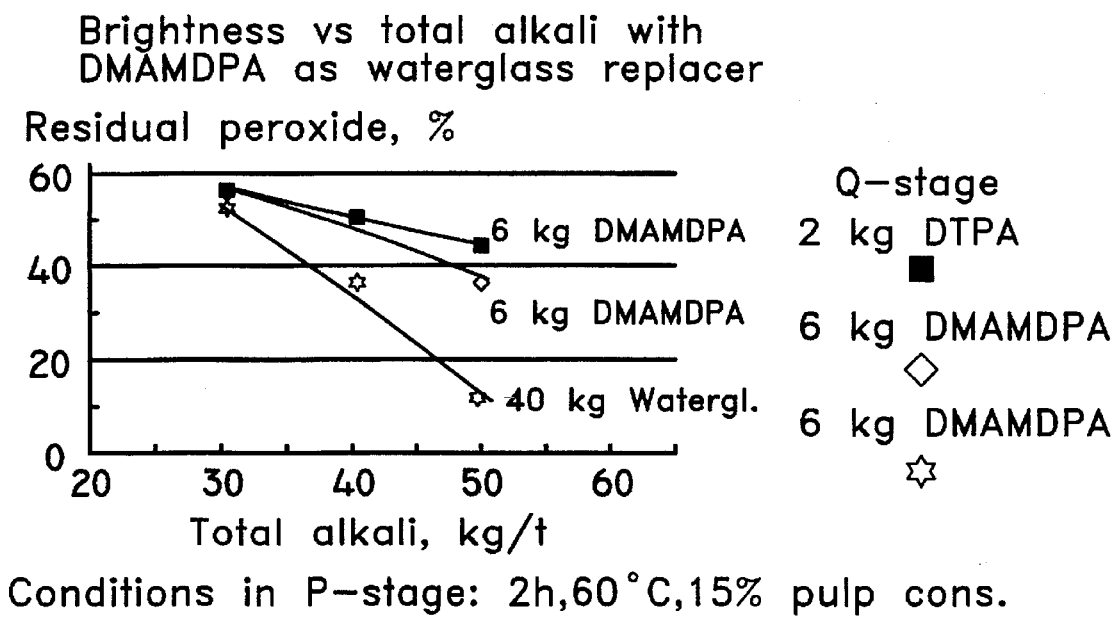

Pulp treated with 2 kg DTPA/t pulp or 6 kg DMAMDPA/t pulp in Q-stage was used. 40 kg peroxide/t pulp was used and alkali was optimized. FIGS. 13 and 14 show the results according to brightness and residual peroxide. It is shown that the sequence with 2 kg DTPA/t pulp (Q-stage) and 6 kg DMAMDPA/t pulp gives the best result on brightness. The brightness is 0.2 units better than DTPA together with waterglass.

EXAMPLE 9

Bleaching with peroxide and MMBA

Figure 15:
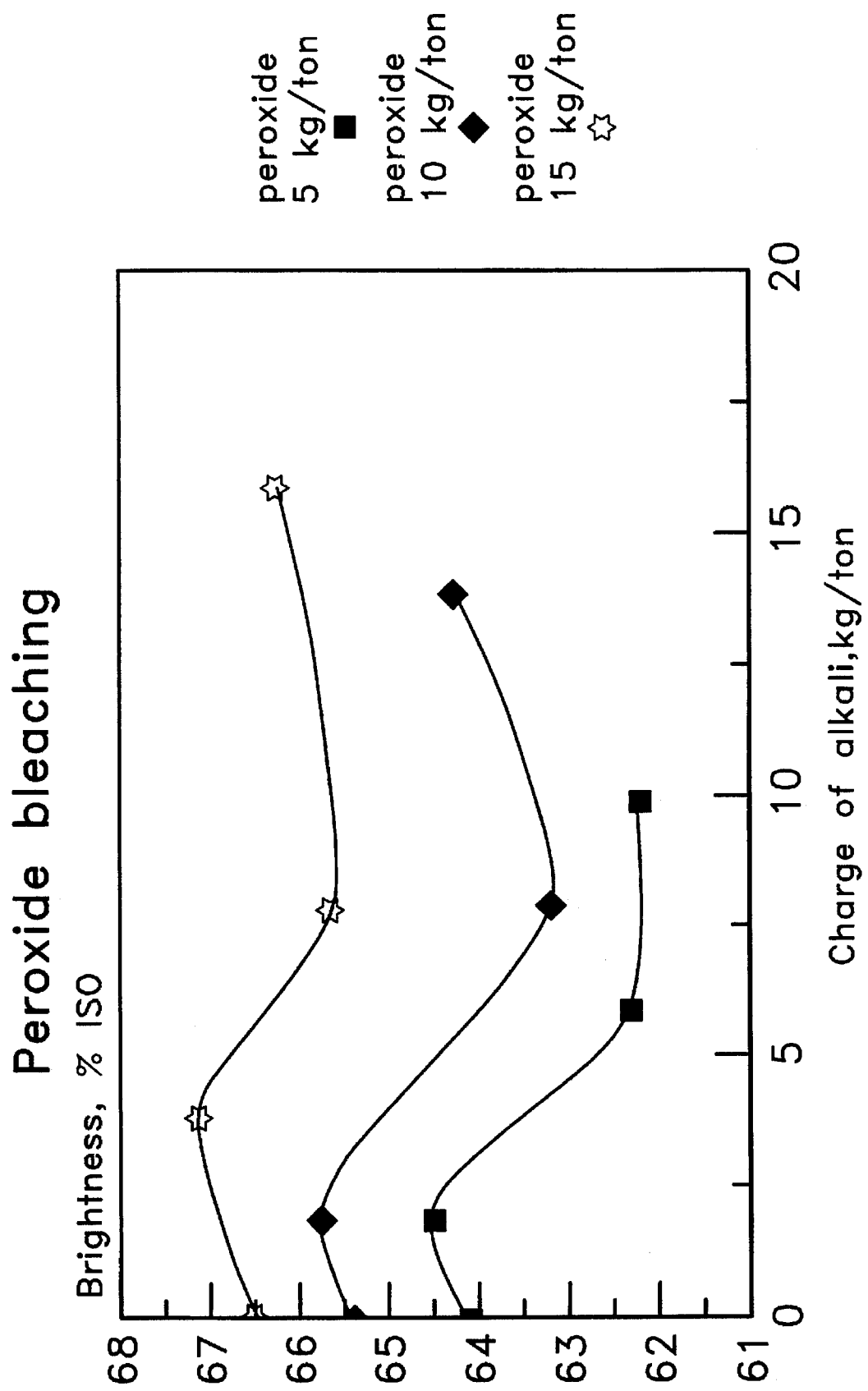
Figure 16:
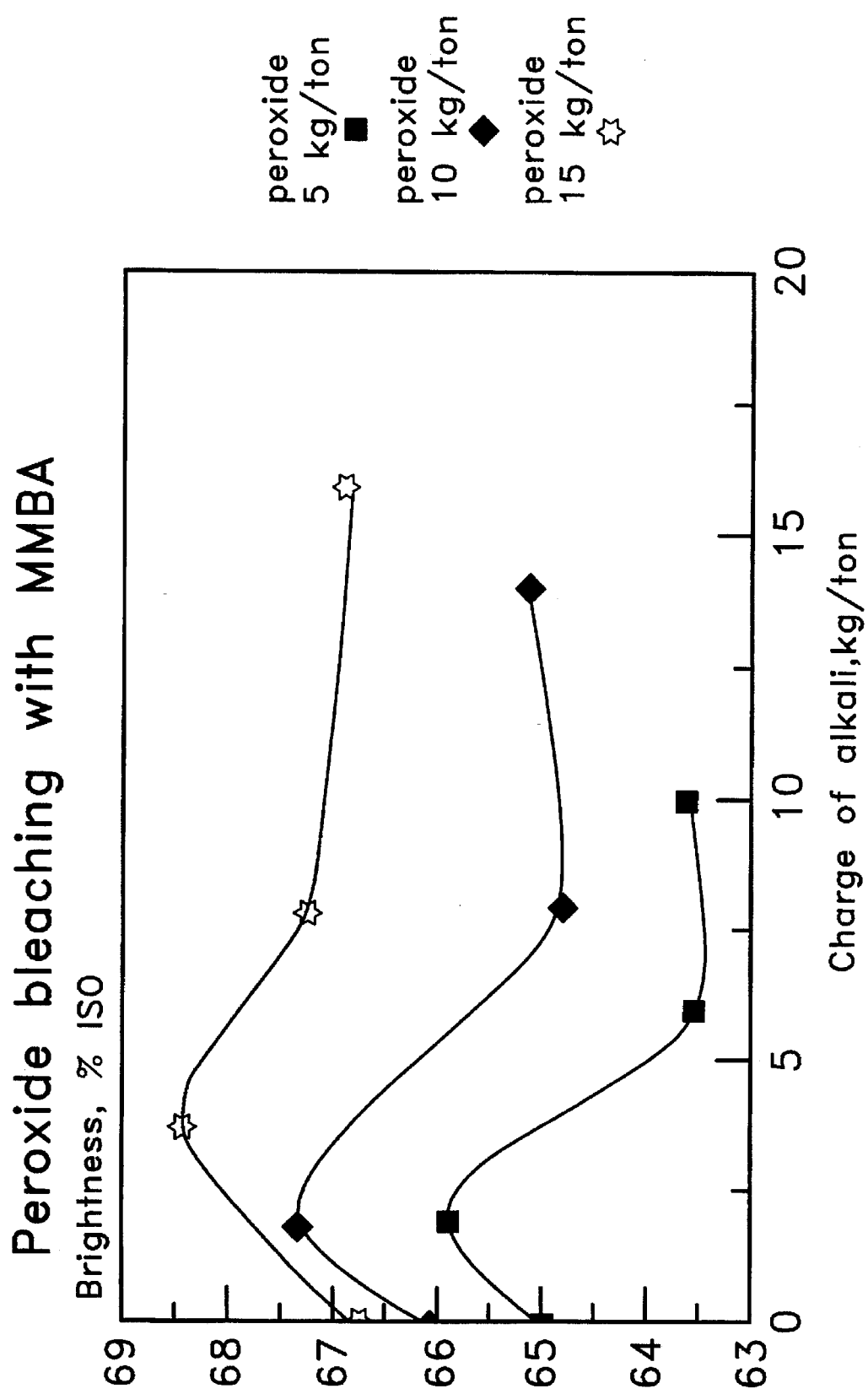
Figure 17:
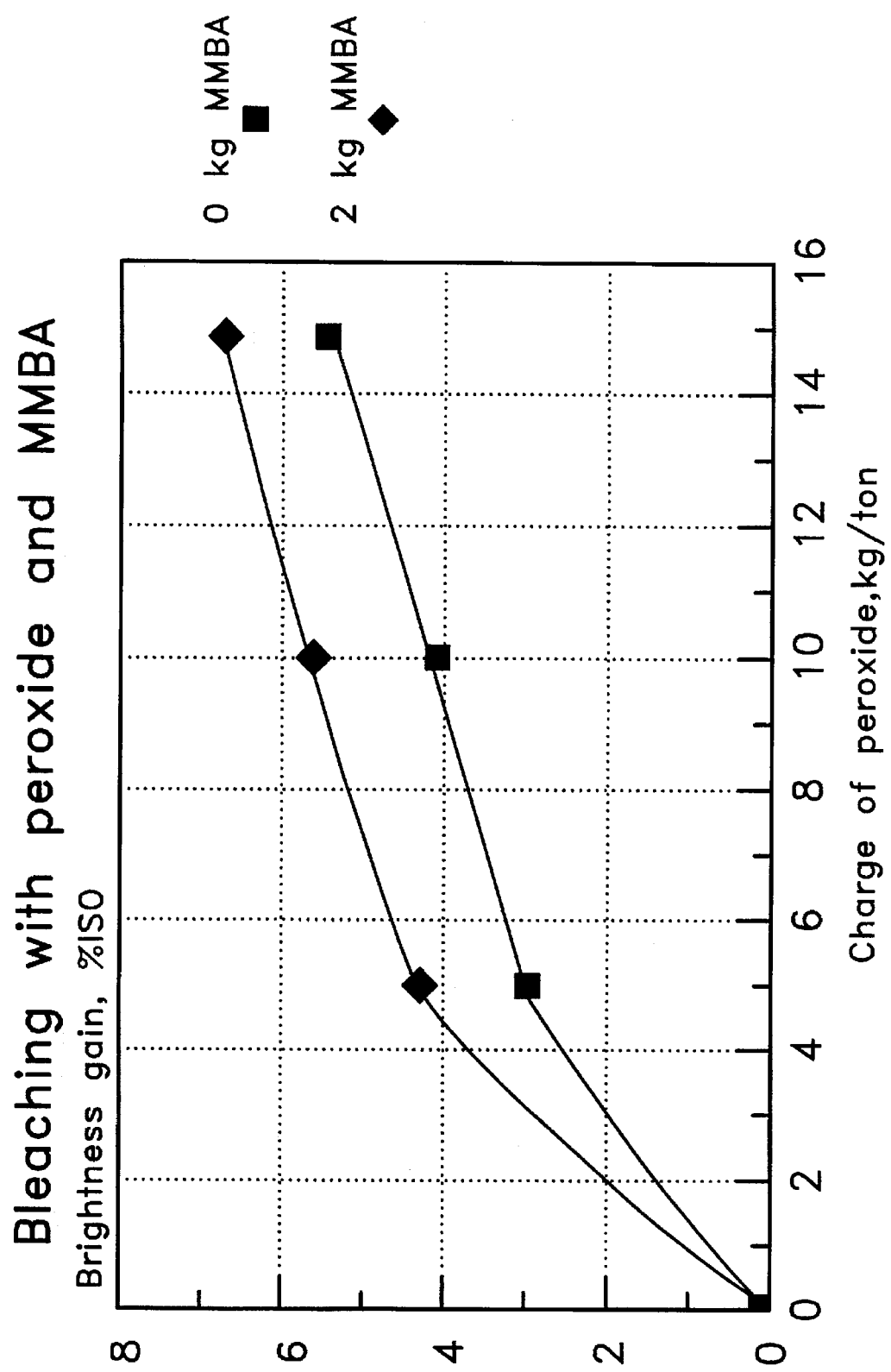

Mixed office waste from a Scandinavian mill was used for bleaching tests. Two bleach trials with peroxide were carried out, with and without MMBA, respectively. Each trial was optimized due to alkali, see FIGS. 15 and 16. The optimum charge of alkali was almost the same in both trials, but when MMBA was added brightness increased with approximately 2% ISO. See FIG. 17. When MMBA was added the residual amount of peroxide increased. It appears that the peroxide was stabilized by MMBA which resulted in a more selective bleaching and less decomposition of the peroxide.

What is claimed is:

1. A process for the bleaching of pulp comprising the step of bleaching the pulp with hydrogen peroxide as the primary bleaching agent wherein said bleaching step is carried out in the presence of an effective amount of at least one biodegradable 1-aminoalkane-1,1-diphosphonate chelating agent of the formula (I):

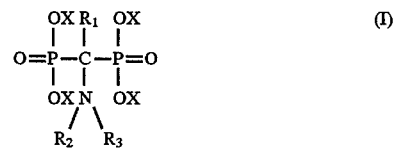

wherein $R_1$ is hydrogen; $R_2$ and $R_3$ are selected from hydrogen, $C_1$–$C_{22}$ alkyl, $C_5$–$C_6$ cycloalkyl, a $C_1$–$C_{10}$ alkanol radical, a carboxy alkyl radical having up to 10 carbon atoms, and, together with the nitrogen atom can form a piperidino, pyrrolidino or a morpholino group; and X is selected from hydrogen, alkali metal and ammonium; to enhance the bleaching of the pulp.

2. The process as claimed in claim 1 wherein from 0.01–2.0 weight percent of said biodegradable chelating agent is employed, based on the total weight of the pulp.

3. The process as claimed in claim 1 wherein from 0.01–2.0 weight percent of an additional additive selected from citric acid, DTPA, EDTA, DTPMP and gluconates and lignosulfates having chelating activity is employed, based on the total weight of the pulp.

4. The process as claimed in claim 1 wherein said bleaching step is carried out in the further presence of 0.1–3.0 weight percent of at least one silicate and up to 0.2 weight percent of magnesium sulphate, based on the total weight of the pulp.

5. The process as claimed in claim 1 wherein said bleaching step is carried out at a temperature of from 40°–95° C. over a period of from 10–120 minutes and at a pH of from 9–12 and wherein the amount of hydrogen peroxide employed is from 0.1–3.0 weight percent, based on the total weight of the pulp.

6. The process as claimed in claim 1 wherein said chelating agent is 4-morpholinomethylene-1,1-diphosphonic acid.

7. A method for enhancing the bleaching of pulp with hydrogen peroxide which comprises utilizing an effective amount of a chelating agent of the formula I:

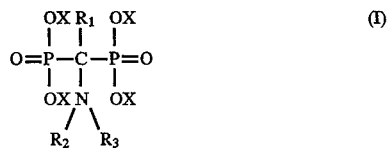
(I)

wherein $R_1$ is hydrogen; $R_2$ and $R_3$ are selected from hydrogen, $C_1$–$C_{22}$ alkyl, $C_1$–$C_6$ cycloalkyl, a $C_1$–$C_{10}$ alkanol radical, a carboxyalkyl radical having up to 10 carbon atoms and, together with the nitrogen atom can form a piperidino, pyrrolidino or a morpholino group; and X is selected from hydrogen, alkali metal and ammonium.

8. The method of claim 7 wherein the chelating agent is 4-morpholinomethylene-1,1-diphosphonic acid and the pulp is mechanical pulp.

9. In a process for bleaching wood pulp comprising the step of bleaching the pulp with hydrogen peroxide as the primary bleaching agent, the improvement comprising pretreating the pulp, prior to said step of bleaching the pulp with hydrogen peroxide, with a sufficient amount of chelating agent of the formula (I) to reduce the metal ion content of the pulp:

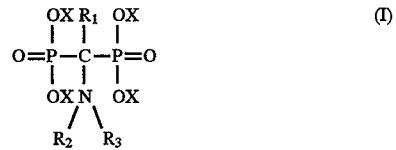
(I)

wherein $R_1$ is hydrogen; $R_2$ and $R_3$ are selected from hydrogen, $C_1$–$C_{22}$ alkyl, $C_5$–$C_6$ cycloalkyl, a $C_1$–$C_{10}$ alkanol radical, a carboxyalkyl radical having up to 10 carbon atoms, and, together with the nitrogen atom can form a piperidino, pyrrolidino or a morpholino group; and X is selected from hydrogen, alkali metal and ammonium.

10. In a process for the deinking of pulp, the improvement comprising carrying out said deinking process in the presence of 0.1–2.0 weight percent, based on the total weight of the deinking composition, of a chelating agent of the formula (I):

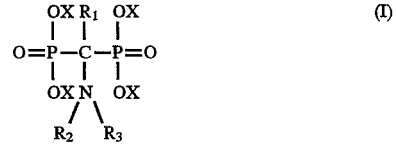
(I)

wherein $R_1$ is hydrogen; $R_2$ and $R_3$ are selected from hydrogen, $C_1$–$C_{22}$ alkyl, $C_5$–$C_6$ cycloalkyl, a $C_1$–$C_{10}$ alkanol radical, a carboxyalkyl radical having up to 10 carbon atoms, and, together with the nitrogen atom can form a piperidino, pyrrolidino or a morpholino group; and X is selected from hydrogen, alkali metal and ammonium.

* * * * *